(No Model.) 3 Sheets—Sheet 2.
R. H. ARTHUR.
COUNTER BALANCE FOR MINING CAGES.
No. 413,123. Patented Oct. 15, 1889.
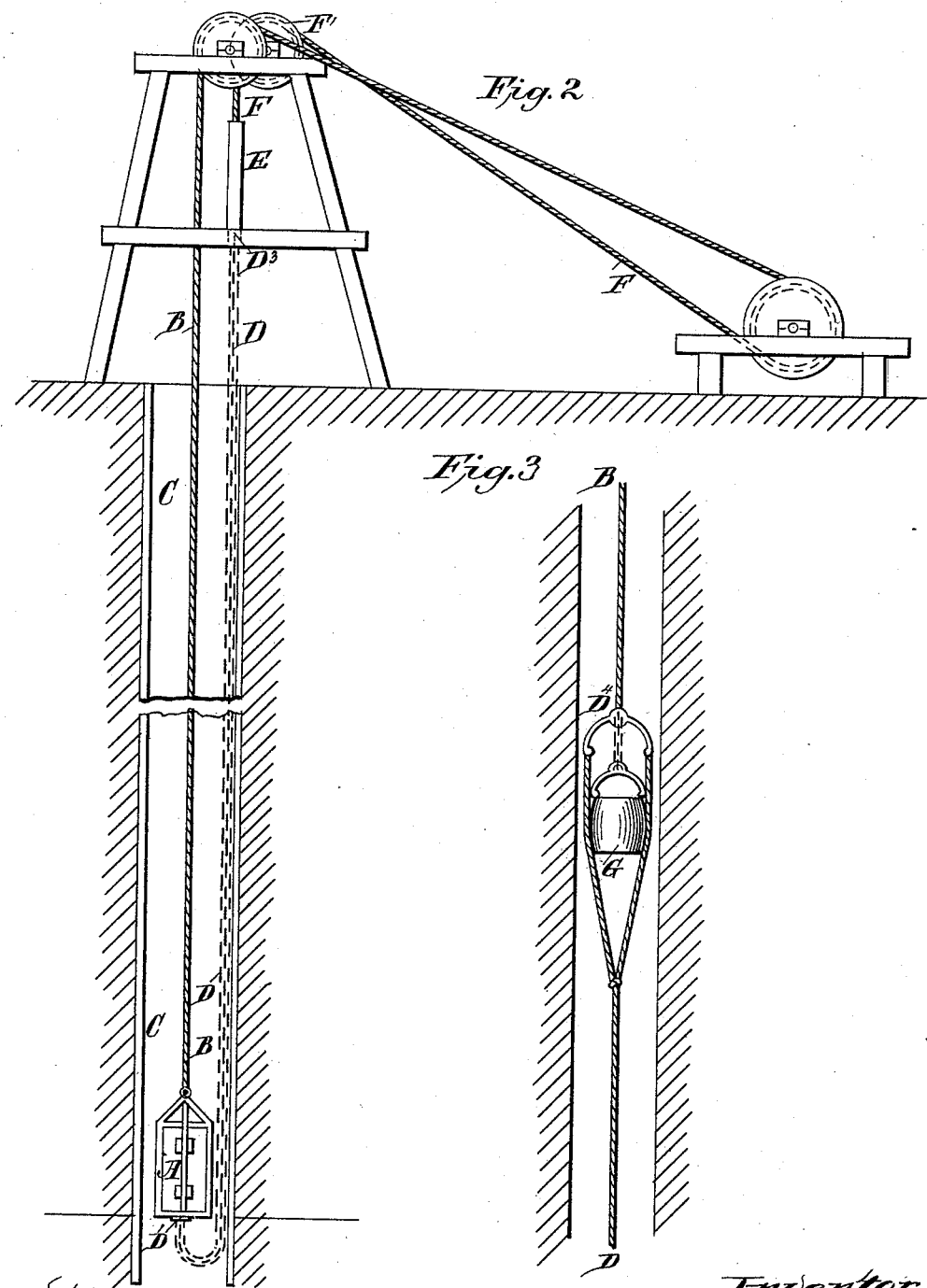

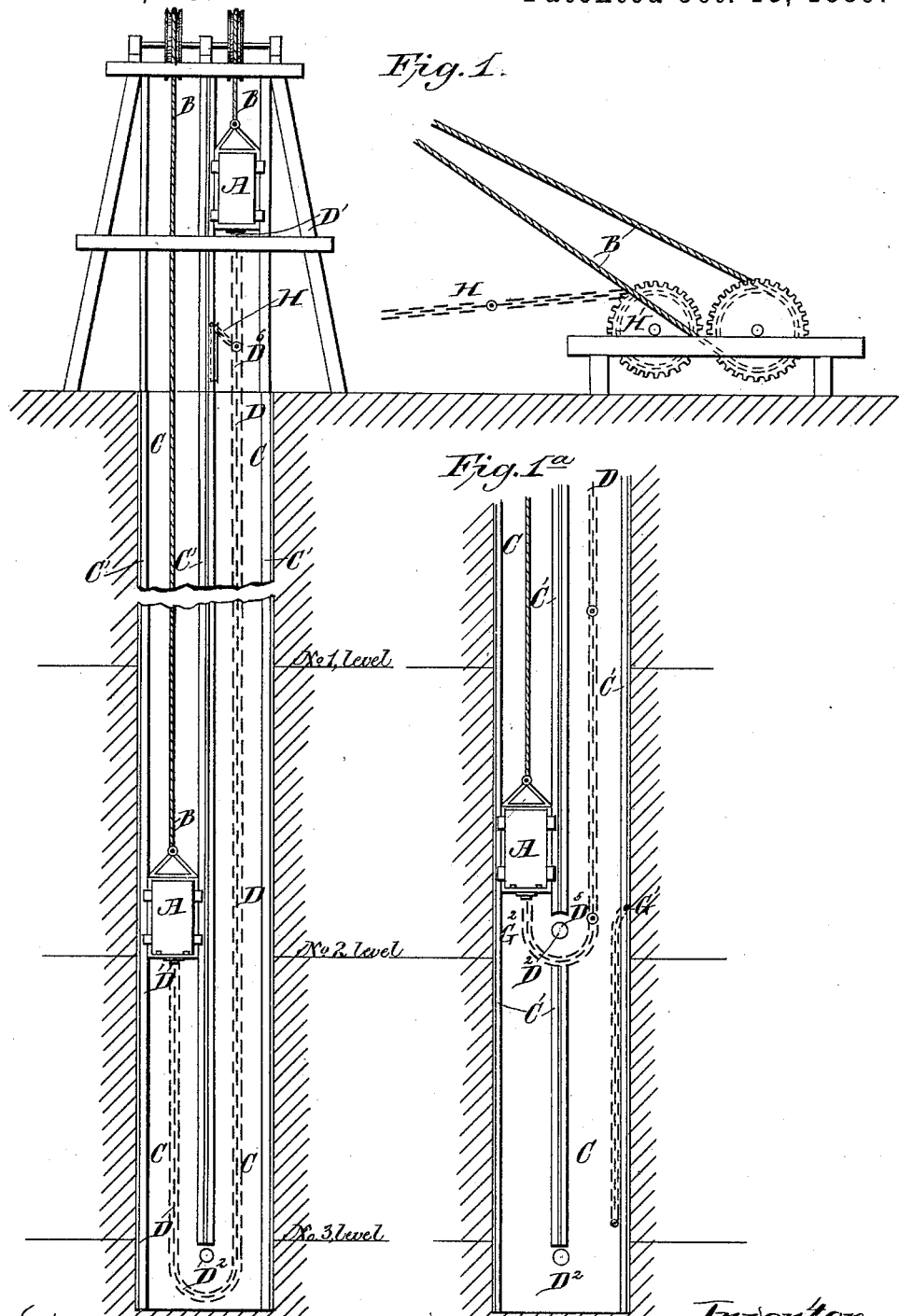

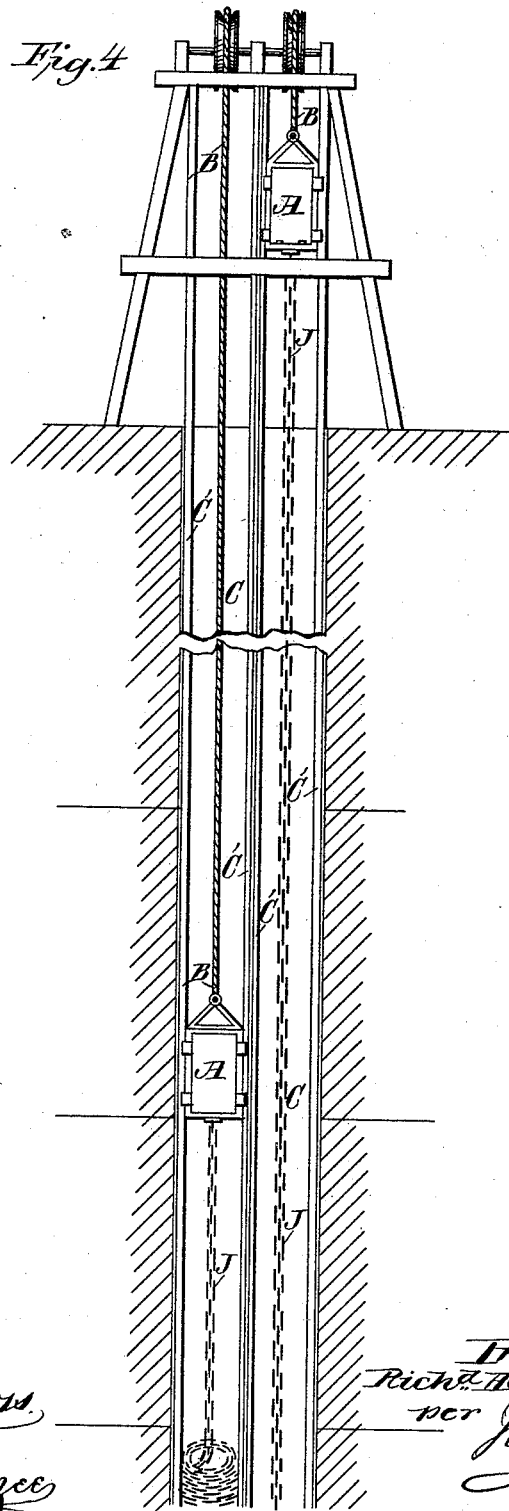

UNITED STATES PATENT OFFICE.

RICHARD HENRY ARTHUR, OF INGLEWOOD, VICTORIA.

COUNTER-BALANCE FOR MINING-CAGES.

SPECIFICATION forming part of Letters Patent No. 413,123, dated October 15, 1889.

Application filed January 5, 1888. Serial No. 259,905. (No model.) Patented in Victoria August 1, 1887, No. 5,214.

*To all whom it may concern:*

Be it known that I, RICHARD HENRY ARTHUR, a subject of the Queen of Great Britain, residing at Brook Street, Inglewood, in the British Colony of Victoria, mining manager, have invented Improved Means for Counterbalancing the Haulage-Ropes and Cages in Mining and other Shafts, (for which I have obtained a patent in the British Colony of Victoria, dated the 1st day of August, 1887, No. 5,214,) of which the following is a specification.

This invention of improved means for counterbalancing the haulage-ropes and cages in mining and other shafts has been designed with the object of lessening the power necessary to raise or haul up the cages, as by my invention all that is required of the hauling-engine is to overcome the weight of the load on the cage and the frictional resistance of the mechanism.

In carrying out my invention in a double-cage shaft, in which the cages balance one another, a counterpoise for the haulage-ropes is arranged between the bottoms of the two cages and takes the form of a pendent chain, which hangs down from the bottoms of the cages in the form of a loop, reaching to nearly the bottom of the shaft. Thus the haulage-rope becomes in a manner endless and is always equally balanced, as the chain used is equal in weight per fathom to that of the haulage-rope, a chain being used simply on account of its flexibility. As an alternative, instead of connecting the bottoms of the cages together with the one pendent loop chain, I employ two separate chains—one hanging down from the bottom of each cage—and each chain being the full length of the shaft's depth, and so also by these means the ropes and chains hanging over the poppet-head pulleys are evenly balanced. This method allows the cages to be worked to any level without interfering with the counterbalance-chains.

In carrying out my invention in a single-cage shaft a counterpoise-chain is again employed, with its one end secured, as before, to the bottom of the cage, while its other end is attached to a weight heavy enough to act as a counterpoise for the cage. The top end of the weight is attached to a rope which passes over a sheave on the poppet-head, and is connected to a winding-drum, from which it winds and unwinds simultaneously with and in the reverse direction to the hauling-rope which supports the cage. The weight is made flat and works in a groove in the side of the shaft, not taking more than two inches of space when only one shaft is available.

In deep whim-shafts, where a bucket is employed in place of a cage, the securing of the counterbalance-chain to its bottom would prevent its being easily tipped. So in such cases I secure the counterbalance-chain to the hauling-rope above the bucket and cause it to hang therefrom in the form of a loop large enough to clear the sides of the bucket. I have also devised means for altering the length of the pendent loop balance chain or rope when the cages are to work from different levels in the shaft, so as to leave only a sufficient length of such balance chain or rope to connect the bottoms of the cages together when they are in their altered positions.

The attached drawings illustrate my invention, Figures 1 and $1^A$ showing the pendent loop chain arrangement for a double-cage shaft, and Fig. 2 its arrangement for a single-cage shaft, while Fig. 3 shows the method of arranging it with a bucket. Fig. 4 shows the alternative separate balance-chain arrangement for a double-cage shaft.

In Fig. 1, A A are the cages supported, as ordinarily, from the haulage-ropes B B, which are connected in the usual manner to their winding-drums. C is the shaft, and C' C' the guide-skids for the cages. D is the counterbalance-chain, secured at its ends D' D' to the under side of the cages. $D^2$ is a guide-roller, suitably supported under the dividing-timbers of the shaft C, to prevent the chain wearing against such timber or division.

In Fig. 2, A is again the cage; B, the cage-hauling rope; C, the shaft, and D the counterbalance-chain, which in this figure has its one end D' attached to the bottom of the cage, while its other end $D^3$ is connected to the weight E, which forms a counterpoise for the cage, and this weight is supported by a rope F, which passes over a poppet-head pulley F'. From thence the rope leads to a winding-drum, from which it is wound and unwound in a reverse direction to the cage hauling and winding rope B.

In Fig. 3, B is again the hauling-rope, and D the counterbalance rope or chain, which is shown supported from the hauling-rope upon the saddle-piece $D^4$, which spreads the rope apart sufficient to allow the bucket G to hang between it.

The first method of altering the length of the pendent loop balance-chain is shown in Fig. $1^A$, and consists in supporting the surplus chain in the shaft. The cages having to work to the position marked "No. 2 level," that part of the chain which is below the cage A and the link $D^5$ is disconnected from them and supported in the shaft by means of the hook $G'$; then a short piece of chain $G^2$ is employed to connect the link $D^5$ with the bottom of the cage A, a suitable opening or passage being made for it through the central partition of the shaft.

The second method shown in Fig. 1 is as follows: When it is not advisable to make openings in the central partitions of the shaft for the chain to pass through, the alteration of the length of the balance-chain may be effected at the surface, the balance-chain having connecting-links at intervals to suit the different levels, as shown. An additional chain H is attached to a winding-drum $H'$, which may be fixed in any suitable position, it being represented in Fig. 1 in front of the hauling-drum. Then the cage A is brought to the brace and the loose winding-drum thrown out of gear, so as to adjust the length of the winding-ropes to suit the required level. The chain H is connected to the link $D^6$ and made to carry the weight of the chain D, when the short piece of the chain between the cage A at brace and the connecting-link $D^6$ is disconnected at $D^6$, the drum H having been previously put in gear. The lower cage A is run to the required level, the drum $H'$ either paying out or taking in the chain, as required, which in this instance always works round the bottom of the shaft. The short chain hanging from the cage A at brace is again connected at $D^6$ and the chain H disconnected, when the drum $H'$ is thrown out of gear and the whole ready for work.

In Fig. 4 is shown the alternative method of counterbalancing the haulage-ropes and cages with two separate chains J, which are secured, as before, to the bottom of the cages A, each chain being of a length equal to the full depth of the shaft and hanging loosely at its bottom.

The mode of operation is as follows: In a double-cage shaft, as shown in Fig. 1, the cages balance each other, and it is only necessary to connect the bottoms of the cages together by a chain D, or its equivalent, of a suitable weight and length; then at any portion of the stroke of the cage they and their hauling-ropes are equally balanced.

In a single-cage shaft, as shown in Fig. 2, a counterpoise has to be provided for both the hauling-rope and the cage; consequently the chain D and the weight E are used, the latter being connected, as above stated, with a hauling-rope F, and thus in a similar manner this cage and its rope are counterbalanced at any portion of their stroke.

In a double-cage shaft having the separate chains attached to its cages, as shown in Fig. 4, when the one cage is up at the brace the counterpoise-chain is hanging out its full length, while the chain attached to the other cage, which is down in the shaft, has its lower part coiled upon itself at the bottom of the shaft.

Having now particularly described and explained the nature of my said invention and in what manner the same is to be performed, I declare that what I claim is—

1. The combination, with two bodies of substantially the same weight, haulage-ropes from which said bodies are suspended and adapted to move vertically in reverse directions, and a flexible counterpoise of substantially the same weight as the haulage-ropes, having its terminals connected with said bodies and depending therefrom, of the auxiliary chain H and auxiliary winding-drum $H'$, arranged relatively to and adapted to co-operate with the counterpoise, substantially as and for the purposes specified.

2. The combination, with two bodies of substantially the same weight, haulage-ropes from which said bodies are suspended and adapted to move vertically in reverse directions, and a flexible counterpoise of substantially the same weight as the haulage-ropes, and having its terminals connected with said bodies and depending therefrom, said counterpoise being made up of sections detachably connected together, of the auxiliary chain H and the auxiliary winding-drum $H'$, arranged relatively to and adapted to co-operate with the counterpoise, substantially as and for the purposes specified.

RICHARD HENRY ARTHUR.

Witnesses:
EDWARD WATERS,
WALTER CHARLES HART.